(12) United States Patent
Ferlicca

(10) Patent No.: US 6,264,014 B1
(45) Date of Patent: Jul. 24, 2001

(54) FRICTION DAMPER FOR WASHING MACHINES OR THE LIKE

(76) Inventor: Roberto Ferlicca, Via Piave, 66, 20040 Busnago, Milan (IT)

( * ) Notice: Subject to any disclaimer, the term of this patent is extended or adjusted under 35 U.S.C. 154(b) by 0 days.

(21) Appl. No.: 09/319,686

(22) PCT Filed: Dec. 9, 1997

(86) PCT No.: PCT/IT97/00303

§ 371 Date: Aug. 18, 1999

§ 102(e) Date: Aug. 18, 1999

(87) PCT Pub. No.: WO98/26194

PCT Pub. Date: Jun. 18, 1998

(30) Foreign Application Priority Data

Dec. 9, 1996 (IT) ............................................... MI96A2577

(51) Int. Cl.[7] ...................................................... B60T 7/12
(52) U.S. Cl. ........................... 188/129; 188/381; 267/201
(58) Field of Search .................................. 267/196, 201, 267/202, 203; 188/129, 130, 381

(56) References Cited

U.S. PATENT DOCUMENTS 4,934,493 * 6/1990 Bauer et al. ......................... 188/381
5,549,182 * 8/1996 Ehrnsberger et al. ................ 267/202
5,961,105 * 10/1999 Ehrnsberger et al. ................ 188/129

FOREIGN PATENT DOCUMENTS

301190 * 5/1988 (EP) .
95/14130 * 5/1995 (WO) .

* cited by examiner

*Primary Examiner*—Douglas C. Butler
*Assistant Examiner*—Robert A. Siconolfi
(74) *Attorney, Agent, or Firm*—Hedman & Costigan, P.C.

(57) ABSTRACT

The present invention relates to a friction damper which has been specifically designed for washing machines or the like. The damper (1a, 1b) comprises a hollow shell (2a, 2b, 2c) and a rod (3), coaxially arranged, which form a telescopic construction. The rod (3) is provided with an outer diameter smaller than the inner diameter of the shell (2a, 2b, 2c), and between the shell (2a, 2b, 2c) and the rod (3), guiding means (4) are provided. The damper further comprises a friction damper element (5) arranged between the rod (3) and the shell (2a, 2b, 2c) and having a first working surface which is frictionally slidably coupled to the rod (3) and a second working surface which is frictionally slidably coupled with the shell (2a, 2b, 2c).

7 Claims, 4 Drawing Sheets

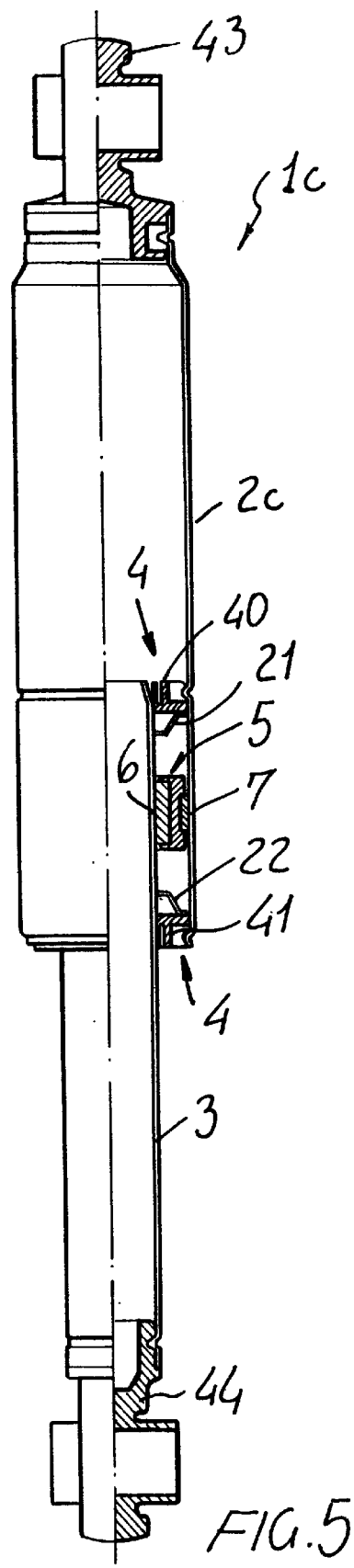
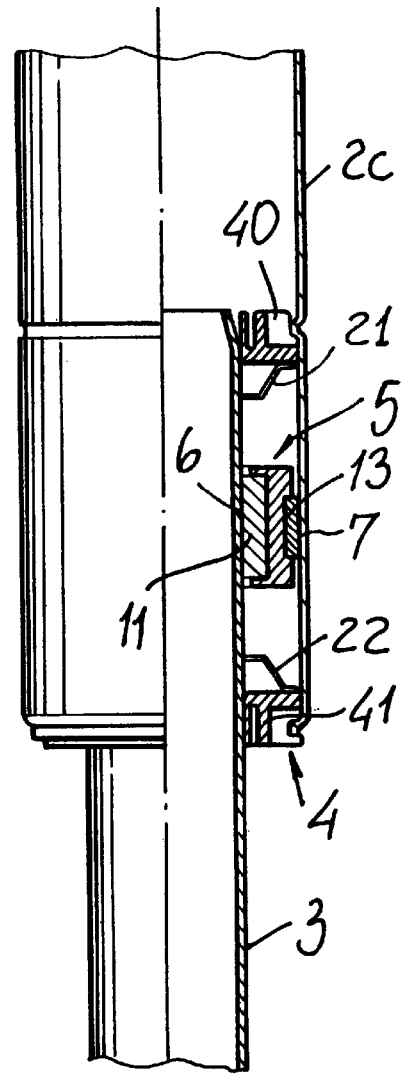
FIG. 5
FIG. 6

FRICTION DAMPER FOR WASHING MACHINES OR THE LIKE

The present application is the national stage filing of and claims priority to International Application No. PCT/IT/9700303, filed Dec. 9, 1996 and Italian Application Serial No. MI96A002577.

BACKGROUND OF THE INVENTION

The present invention relates to a friction damper which has been specifically designed for washing machines and the like.

As is known, the basket of a washing machine is affected, during the rotary movement thereof, by oscillations due to a dynamic unbalancing of the rotary mass of the basket and of the lineN held therein.

Said basket is usually suspended, by springs, to the washing machine frame and, in order to dampen the above mentioned oscillations or vibrations, two dampers or shock absorbers are conventionally used, each of which is coupled, at the bottom end portion thereof, to the washing machine frame and, at the top portion thereof, to the basket.

Dampers for a washing machine application comprise friction dampers, which are substantially constituted of a shell, having a substantially cylindrical shape, inside of which a rod is adapted to slide, between the rod and shell being arranged a gasket made of a friction material, said gasket being rigidly coupled to the shell or to the rod.

This gasket is designed for providing a friction braking operation in order to brake the mutual displacement of the rod with respect to the shell.

While the above mentioned dampers have been found to provide an efficient damping of the basket oscillations in washing machines, they, however, generate a comparatively high friction rubbing during the washing machine washing steps thereby causing the basket to oscillate, even if in a comparatively small degree. Consequently, the dampers are quickly worn out, in particular at the region thereof which is engaged with the friction material gasket, thereby quickly reducing the operating efficiency of this gasket which must be frequently replaced.

SUMMARY OF THE INVENTION

Accordingly, the aim of the present invention is to overcome the above mentioned problem, by providing a friction damper, specifically designed for washing machines or the like, which is adapted to differentially operate depending on the washing machine operating steps, i.e. depending on the amplitude of the washing machine basket oscillations, so as to provide a greater damping as said oscillation amplitude is great.

Within the scope of the above mentioned aim, a main object of the present invention is to provide such a friction damper which has an operating life much greater than that of conventional friction damper, by reducing, during the normal operating steps of the washing machine, i.e. as the washing machine basket is affected by small amplitude oscillations, the friction energy dissipation.

Another object of the present invention is to provide a friction damper which is very simple construction wise and which can be made at a competitive cost.

A further object of the present invention is to provide such a friction damper which is very reliable and safe in operation.

According to one aspect of the present invention, the above mentioned aim and objects, as well as yet other objects, which will become apparent hereinafter, are achieved by a friction damper, specifically designed for washing machines or the like, comprising a hollow shell and a rod coaxially arranged with respect to one another and forming a telescopic motion construction, said rod having an outer diameter less than an inner diameter of said shell and, between said shell and rod, rod guiding means being arranged, characterized in that said damper further comprises a friction damper element, arranged between said rod and shell and including a first working surface frictionally slidably coupled to said rod and a second working surface frictionally slidably coupled to said shell.

BRIEF DESCRIPTION OF THE DRAWINGS

Further characteristics and advantages of the friction damper according to the present invention will become more apparent hereinafter from the following disclosure of some preferred, though not exclusive, embodiments of the friction damper which are illustrated, by way of a merely indicative, but not limitative, example in the figures of the accompanying drawings, where:

FIG. 5 is an axial cross-sectional view illustrating a third embodiment of the friction damper according to the invention;

FIG. 6 illustrates an enlarged detail of FIG. 5;

DESCRIPTION OF THE PREFERRED EMBODIMENTS

Figure 1:
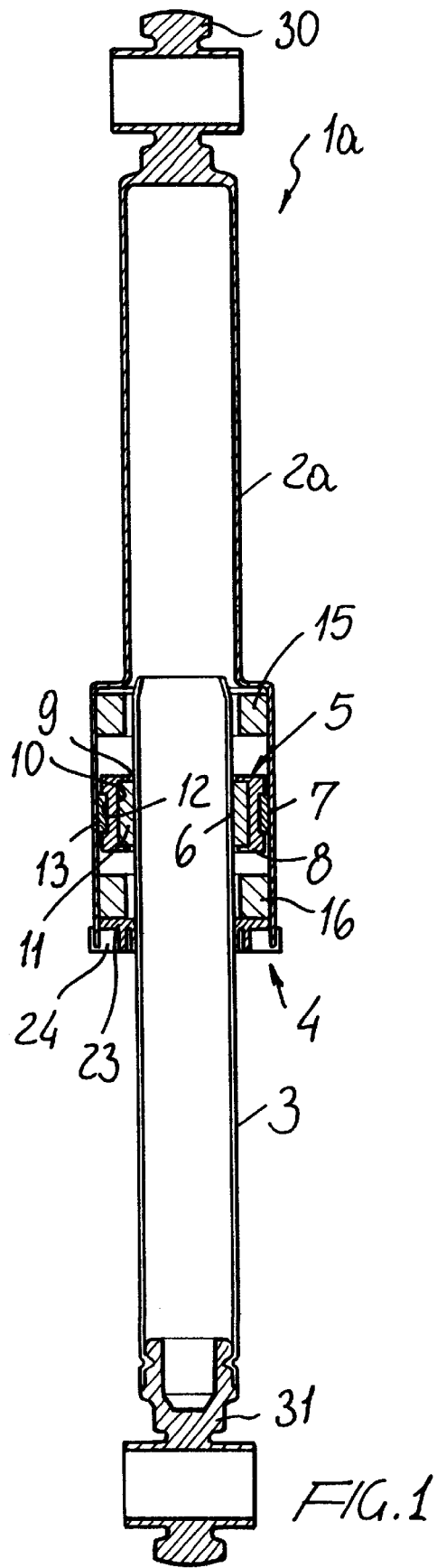
FIG. 1 is an axial cross-sectional view illustrating a first embodiment of the friction damper according to the present invention.

With reference to the number references of the above mentioned figures, the friction damper, according to the present invention, which has been generally indicated, in its three embodiments, by the reference numbers 1a, 1b, 1c, comprises a hollow shell 2a, 2b, 2c and a rod 3, which are coaxially arranged with respect to one another, and form a telescopic motion construction.

The rod 3 is provided with an outer diameter smaller than the inner diameter of the shell 2a, 2b, 2c and between the shell and rod guiding means 4 for guiding said rod 3 are arranged.

The subject friction damper comprises moreover a friction damper element 5, arranged between the rod 3 and shell 2a, 2b, 2c and having a first working surface 6, which is frictionally slidably coupled to the outer surface of the rod 3 and a second working surface 7, which is frictionally slidably coupled to the inner surface of the shell 2a, 2b, 2c.

More specifically, the friction damper element 5 comprises, in the embodiments thereof herein disclosed, a holding bushing 8, having a substantially cylindrical shape, which is provided with a throughgoing hole 9 for allowing the rod 3 to pass therethrough, said bushing being fitted about said rod 3.

On the inner surface of the holding bushing 8 is provided a holding seat 10 adapted to receive a friction clamp 11, whereas on the outer surface thereof a further holding seat 12 is defined, for receiving a further friction clamp 13, provided for contacting the inner surface of the shell 2a, 2b, 2c.

As shown, the first working surface 6, i.e. the working surface of the friction clamp 11, engaged with the outer surface of the rod 3, provides a friction reaction which is greater than the friction reaction of the second working surface 7, i.e. the working surface of the friction clamp 13, engaged with the inner surface of the shell 2a, 2b, 2c.

The damper element 5 is arranged in a space provided between the rod 3 and shell 2a, 2b, 2c, which is axially delimited by a pair of resilient elements.

Figure 2:
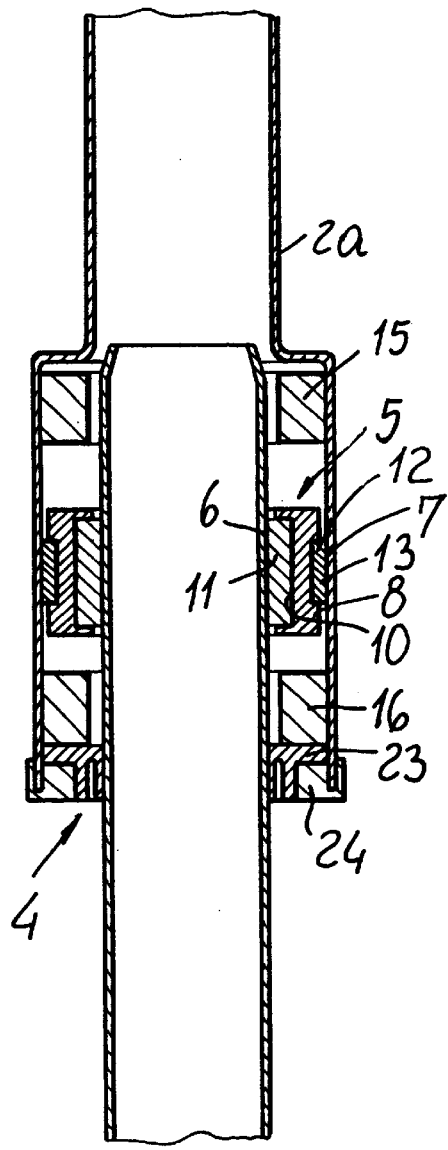
FIG. 2 illustrates an enlarged detail of FIG. 1.

As is clearly shown in FIGS. 1 and 2, said resilient elements can comprise a pair of cup pressing springs, respectively indicated by the reference numbers 15 and 16 and being schematically represented.

Figure 3:
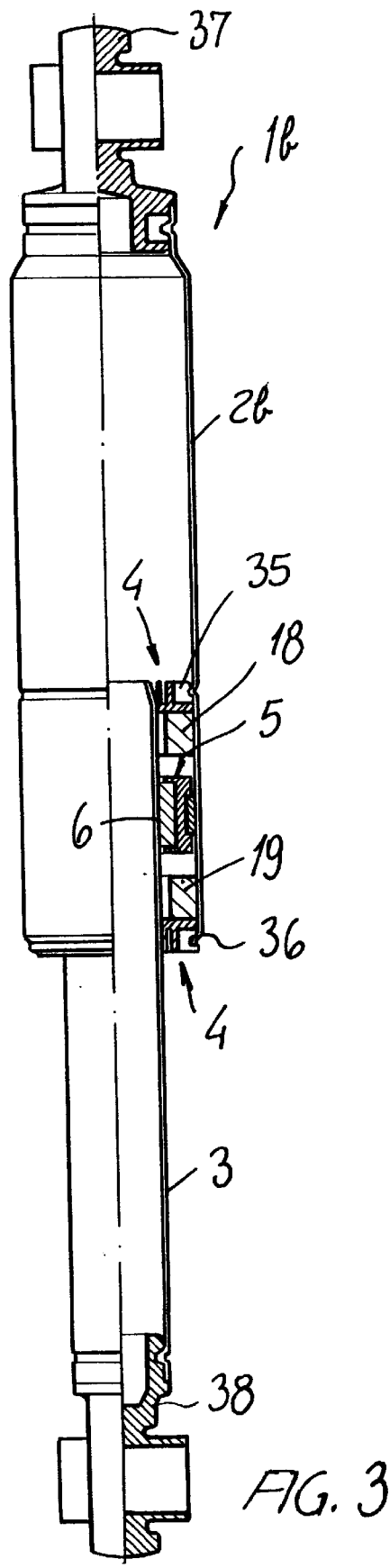
FIG. 3 is an axial cross-sectional view illustrating a second embodiment of the friction damper.
Figure 4:
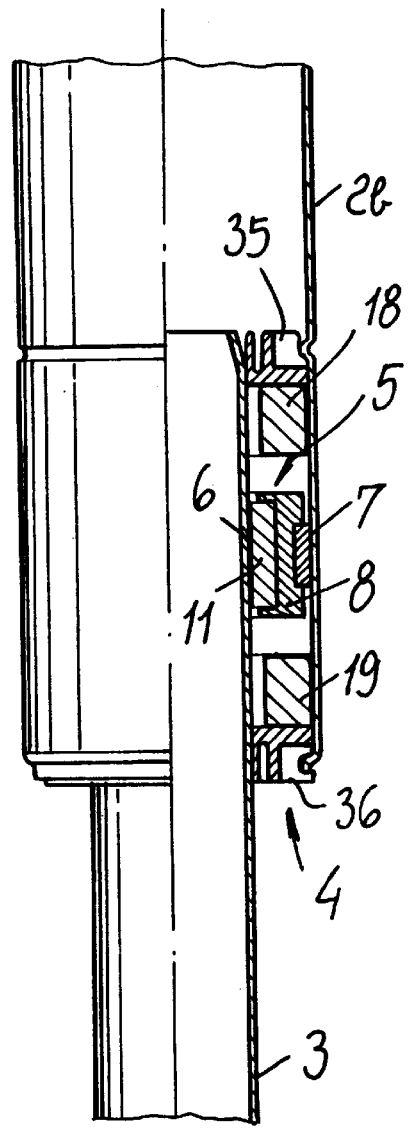
FIG. 4 illustrates and enlarged detail of FIG. 3.
Figure 7:
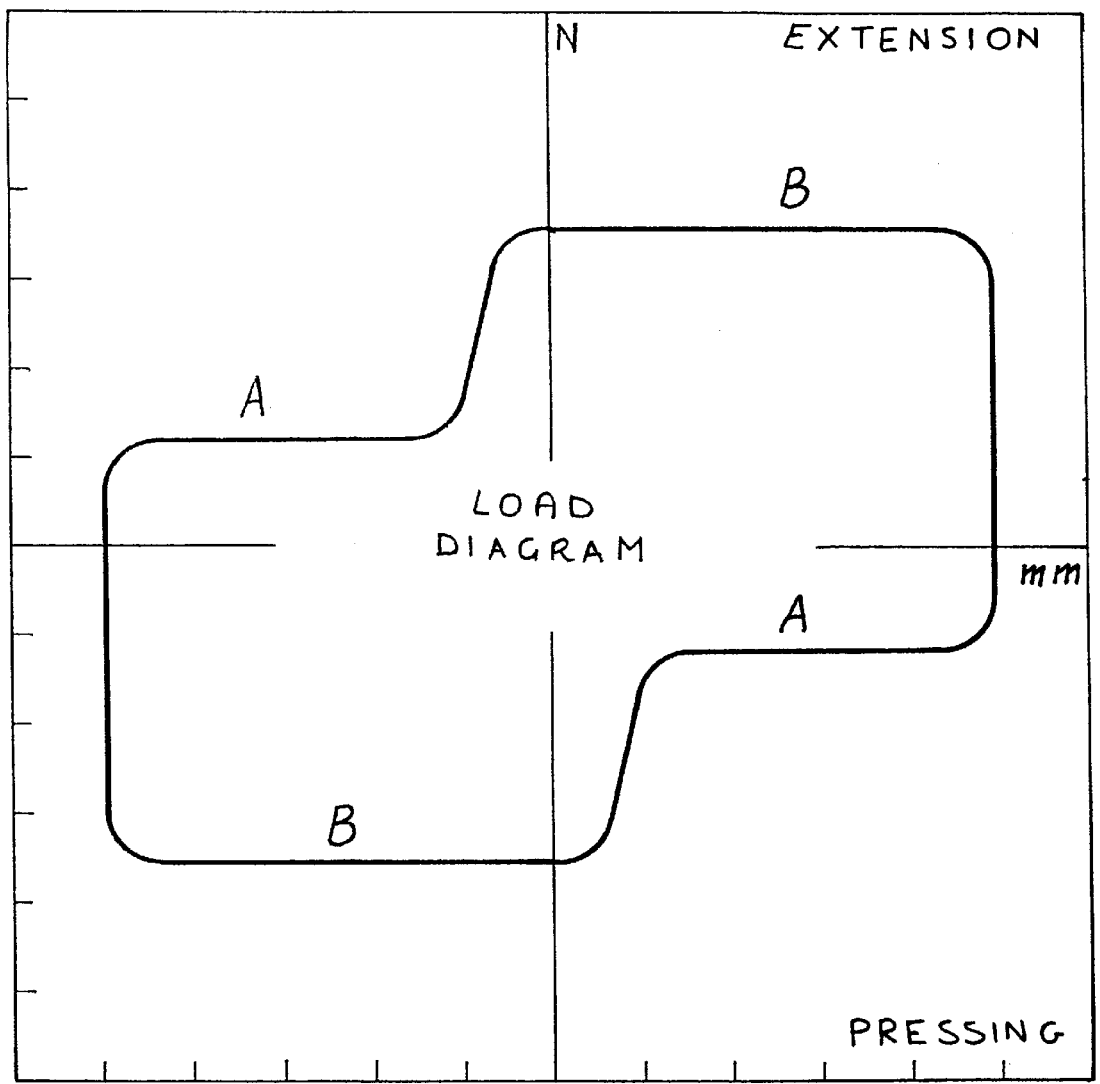
FIG. 7 illustrates a load diagram of the damper according to the present invention, and clearly shows the variation of the damper load as the pressing thereon and/or extension thereof is varied.

As clearly shown in FIGS. 3 and 4, said resilient elements, which axially delimit the space in which is held the friction damper element 5, can comprise a pair of resiliently compressible pads 18 and 19.

As shown in FIGS. 5 and 6, said resilient elements can also be constituted by a pair of cup pressing springs 21 and 22.

In the first embodiment shown in FIGS. 1 and 2, the shell 2a is provided, at the end portion thereof housing therein the friction damper element 5, with an increased diameter defining a shoulder for the innermost cup pressing spring 15.

The end axial portion of said enlarged part of the shell 2a supports guiding means 4, comprising a guiding bushing 23.

Said guiding bushing 23 is axially locked by a closure disc 24, fitted on the enlarged diameter portion of the shell 2a.

The end of the shell 2a opposite to the enlarged diameter portion thereof, ends with an anchoring head 30, which can be made in a single piece with the shell 2a.

The end of the rod 3 opposite to the end thereof entering the shell 2a, is also coupled to an anchoring head 31.

In the embodiment shown in FIGS. 3 and 4, the guide means for guiding the rod 3 inside the shell 2b comprise a pair of guide bushings, respectively indicated by the reference numbers 35 and 36.

The guide bushings 35 and 36, thereagainst the pads 18 and 19 abut, are axially locked by inwardly deformed portions of the shell 2b, which can comprise, for example, caulked, upset portions, or portions deformed by any other suitable deforming method.

In this embodiment, the end of the shell 2b opposite to the end thereof therethrough said rod 3 is entrained, is coupled to an anchoring head 37, whereas the end of the rod 3 opposite to the end thereof entering the shell 2b is coupled to an anchoring head 38.

In the embodiment shown in FIGS. 5 and 6 too, the guide means comprise a pair of guide bushings 40 and 41 defining two opposite bearing surfaces for the cup pressing springs 21 and 22 and which are locked by inwardly deformed portions of the shell 2c, in a like manner to that which has been disclosed with reference to the embodiment shown in FIGS. 3 and 4.

Even in this case, one end of the shell 2c is coupled to an anchoring head 43, whereas the end of the rod 3 opposite to the end thereof engaged inside the shell 2c is coupled to a respective anchoring head 44.

The friction damper according to the present invention operates as follows.

During a normal operation of the washing machine, i.e. as the washing machine basket is affected by low amplitude oscillations, because of a comparatively high friction existing between the friction damper element 5 and rod 3, the damper element 5 can rigidly axially translate with the rod 3 and, accordingly, a comparatively small friction dissipation will occur only between the friction clamp 13 and inner surface of the shell 2a.

As the washing machine centrifuge is operated, or as said centrifuge is turned off, or as the basket is affected by greater amplitude oscillations, the friction damper element 5 will be driven by the rod 3 against one of the resilient elements comprising the cup springs 15, 16, 21, 22 or the pads 18, 19 and, as a consequence of the above mentioned abutment, or locking, the rod 3 will be caused to slide with respect to the friction clamp 11 which, as mentioned, will provide a friction reaction greater than that provided by the friction clamp 13.

Thus, the greater amplitude oscillations of the basket will be damped with a greater friction damping.

In this connection it should be pointed out that the friction damper element 5 can slide in a cylindric housing the length of which is so designed to prevent said damper element from contacting the cup springs 15, 16, 21 and 22 or the pads 18 and 19 during a centrifugation step, in the absence of anomalous oscillations.

From the above disclosure and from the figures of the accompanying drawings, it should be apparent that the invention fully achieves the intended aim and objects.

In particular, the fact is to be pointed that a friction damper has been provided which generates a comparatively small friction reaction as the basket is affected by comparatively small amplitude oscillations, i.e. during a normal operation of the washing machine, thereby providing a great reduction of the damper wear, as well as a greater friction damping reaction as the basket is affected by comparatively large amplitude oscillations, for example as the washing machine centrifuge is turned on and off, thereby efficiently damping these oscillations.

While the invention has been disclosed and illustrated with reference to preferred embodiments thereof, it should be apparent that the disclosed embodiments are susceptible to many modifications and variations all of which will come within the scope of the appended claims.

What is claimed is:

1. A friction damper for washing machines, comprising a hollow shell and a rod, coaxially arranged with respect to one another and forming a telescopic motion construction, said rod having an outer diameter less than an inner diameter of said shell, rod guiding means arranged between said hollow shell and rod, a friction damper element, arranged between said rod and hollow shell in a space delimited by a pair of top and bottom resilient means, said damper element comprising a substantially cylindric holding bushing having a throughgoing axial hole and fitted about said rod, said bushing having an inner surface and an outer surface in which seats are formed for housing a first friction clamp and a second friction clamp, said first and second friction clamp being arranged concentrically, said first friction clamp having a first working surface frictionally engaging an outer surface of said rod and said second friction clamp having a second working surface frictionally engaging an inner surface of said hollow shell, wherein said first working surface is larger that said second working surface thereby said first working surface provides against said rod a friction reaction greater than a friction reaction provided by said second working surface against said hollow shell.

2. A friction damper, according to claim 1 wherein said resilient means comprise a pair of cup springs.

3. A friction damper, according to claim 1, wherein said resilient means comprise a pair of resiliently compressible pads.

4. A friction damper, according to claim 1, wherein said rod guiding means comprise at least a guide bushing axially locked inside said shell and therethrough said rod slidably passes.

5. A friction damper, according to claim 1, wherein said rod guiding means comprise a pair of guide bushings, axially locked inside said hollow shell and therethrough said rod slidably passes, said guide bushings being arranged outside of said space axially delimited by said resilient means.

6. A friction damper, according to claim 5, wherein said guide bushings are axially locked by inwardly deformations of said hollow shell.

7. A friction damper, according to claim 1, wherein said space axially delimited by said resilient means is defined by an enlarged diameter region of said shell.

* * * * *